United States Patent [19]

Rhodes, Jr. et al.

[11] 3,933,937
[45] Jan. 20, 1976

[54] MOLDING-GRADE POLYURETHANE

[75] Inventors: Richard D. Rhodes, Jr., Somersworth; William M. Humphrey, Jr., Dover, both of N.H.

[73] Assignee: McCord Corporation, Detroit, Mich.

[22] Filed: May 15, 1974

[21] Appl. No.: 469,946

[52] U.S. Cl.......... 260/859 R; 260/77.5 CR; 293/60
[51] Int. Cl.$^2$........................................ C08L 27/00
[58] Field of Search................ 260/77.5 CR, 859 R; 293/60

[56] References Cited
UNITED STATES PATENTS

| | | | |
|---|---|---|---|
| 3,418,354 | 12/1968 | Wheeler........................ | 260/448.2 |
| 3,652,639 | 3/1972 | Pizzini et al.................. | 260/859 R |
| 3,823,201 | 7/1974 | Pizzini et al.................. | 260/859 R |

*Primary Examiner*—M. J. Welsh
*Attorney, Agent, or Firm*—McGlynn and Milton

[57] ABSTRACT

A relatively inexpensive injection molding-grade thermoplastic polyurethane is based on a modified polyether diol. This elastomer has improved toughness, abrasion resistance and good mechanical properties. Its temperature insensitivity and low temperature flexability are exceptional. It is flexible to impact at −50°F and stiff enough at 250°F to allow painting without distortion. Of special interest is the fact that this grafted PPG-based polymer is injection moldable and possesses properties adequate for exterior automobile trim components and the like.

The modified polyether polyol is a poly(oxypropylene) diol reacted with a 50/50 styrene/acrylonitrile monomer mixture using a free radical catalyst. While a one shot method of preparation can be used, the capped polyol is preferably reacted with an aromatic diisocyanate to form a prepolymer in a known manner. The prepolymer is thereafter reacted with a $C_2$ to $C_6$ alkane diol, pan cast, cured and aged, followed by grinding to give the molding composition.

5 Claims, No Drawings

MOLDING-GRADE POLYURETHANE

RELATED APPLICATION

This application is related to an application entitled "Thermoplastic Polyurethane", Ser. No. 469,959 by the present inventors and filed simultaneously herewith, the process illustrated therein being applicable to the present invention.

DESCRIPTION

Thermoplastic polyurethanes have been prepared from polyether and polyester polyols. The polyester polymers are relatively expensive and have good to excellent physical properties overall but such polymers have generally poor humidity resistance and low temperature properties. Injection moldable polyether-based polymers have been based on the PTMEG polyols which are expensive. Conventional PPG ether based polymers are not amenable to injection molding and have physical properties unacceptable for use in demanding applications such as automobile exterior trim parts.

It has now been found that a polyether diol-based urethane elastomer of injection molding quality and with good to excellent overall physical properties can be prepared from a polyether diol reacted with a 50/50 mixture of a styrene/acylonitrile monomer mixture.

This modified polyether polyol is preferably reacted in the usual manner with an aromatic diisocyanate to prepare a prepolymer have a free NCO content in the range of 7 to 15%.

The prepolymer is thereafter reacted with a short chain alkane diol and cast in slab form or extruded and pelletized. After curing and aging for a few days the resulting elastomer is ground to prepare the molding composition. Materials such as colorants and stabilizers may be blended into the ground elastomer to give a complete molding composition.

The molding composition can be molded in any conventional manner such as injection molding to 400° to 500°F in a plunger-type machine. The molded product is generally tough and abrasion resistance and, somewhat surprisingly, has superior humidity and aging resistance, and exceptional low temperature flexability.

For example, an elastomer of this invention having a flex modulus (ASTMD-790) of 15,000 psi will consistently pass a −20° F painted Dart Impact (FBMS-2-23) and cold flex test (FBTM-58-5)

The following table gives the ingredients and the preferred proportions that can be used to prepare the present polyurethane:

| | |
|---|---|
| modified polyol, PBW* | 100 |
| Aromatic polyisocyanate, to FNCO of: | 7 to 15 |
| C$_2$-C$_6$ alkane diol, PBW | 5 to 30 |

*parts by weight

The modified polyol is a 2000 to 5000 molecular weight reaction product of:
a. 70 to 90 weight percent of a 1000 to 4000, preferably 2400 to 3200, molecular weight poly (oxy C$_1$-C$_4$ alkene) diol, reacted by a free radical polymerization with
b. 10 to 30 weight percent of a monomer mixture of 1 part by weight of a vinylaromatic and, 0.1 to 9, preferably 0.3 to 3 parts of an olefinic C$_2$-C$_6$ nitrile.

The aromatic polyisocyanate is any of the commercially used ones and is preferably selected from the group consisting of 4, 4' -diphenylmethane diisocyanate (MDI); tolylene diisocyanate (TDI); 1, 5 naphthalene diisocyanate; dianisidine diisocyanate (DADI); 3, 3' -demethyl 4, 4' -biphenyl diisocyanate (XDI).

The straight-chain alkane diol is preferably end-terminated with the hydroxy groups.

The prepolymer process is quite straightforward but if the following procedure is not followed with reasonable care a thermoset and sometimes microcellular elastomer may result. The index of the mixture, the reaction temperatures, and water contents of the ingredients should be closely controlled, as it known.

The grafted polyol is degassed and heated, for example, to 235°F and the aromatic diisocyanate is added with the mixture being allowed to exotherm, for example, to 250°F. It is then degassed and the free NCO content obtained. Preferably the free NCO is in the range of 8 to 12. In the example it was 8.35. The prepolymer can be stored in readiness for the next step.

The short chain diol such as 1,4 -butanediol (BDO), is separately prepared, and dried if necessary, and mixed with the wax release agent, if a wax is to be used. The diol mixture and the prepolymer are preferably brought together in a casting machine in a continuous manner at about 230°F. After thorough mixing of the two ingredients, the mixture is cast out in a casting pan, which is preferably maintained at a temperature above 210°F. The cast layer can for example be 1 inch thick and after being allowed to set 4 or 5 minutes, can be cut into 3 × 3 inch chunks, removed and placed in containers. After aging for a week or so the elastomer can be ground to the size desired for molding and mixed with whatever additional materials may be desired. Alternatively, the mixture of diol and prepolymer can be extruded and pelletized to give a moldable composition.

It has also been found that by the addition of catalyst to the mixture, the reactions can be speeded up so that polyurethane can be directly cast into a mold to produce a molded product. The catalyst used can be of the dibutyl-tin-dilaurate, mercaptide or other known type and the casting temperature can be substantially lower, say 105°F, with the mold being at 160°-180°F.

The following gives an example of the invention:

EXAMPLE

| | Equivalent | PBW |
|---|---|---|
| Modified polyol | 1.0 | 100 |
| MDI | 5 | 35.68 |
| BDO | 4.02 | 12.89 |
| Wax, phr. | | 0.2 |
| Specific Gravity | | 1.15 |
| Hardness, Shore D (5 secs) | | 25 |
| Tensile Strength (orig.) | | 1169 |
| after 70 hrs.212°F | | (+2.6%)1199 |
| after 7 da/175°F/100%RH | | (+1.5%)1187 |
| Elongation (orig.) | | 253 |
| after 70 hrs./212°F | | (−28.8%)180% |

| | Equivalent | -continued PBW |
|---|---|---|
| after 7 da./175°F/100% RH | | (−26.1%)187% |
| Tear Strength (Die C) | | 210 |
| Stiffness | | |
| at 72°F 0.5 in lbs. (orig.) | | 5819 |
| at −20°F 3.0 in lbs. | | 9855 |
| after 70 hrs./212°F 0.5 in/lbs | | (+14.3%)6650 |
| at 160°F 0.25 in lbs | | 4839 |
| Tensile set at 200% elongation | | 61.0% |
| Dart impact-flex at −20°F (Fisher Body Test) | | |
| as received | (no fracture) | Penetrate no shatter |
| after 70 hrs./212°F | (no fracture) | Pass |
| Stretch test at 250°FF | (4% max.) | No change |

The grafted polyol was Union Carbide Company's NIAX D-432, a polymer of about 4000 molecular weight made by reacting 80 weight percent of a 2800 molecular weight poly (oxyalkylene) diol with 20 weight percent of a 50/50 (by weight) styrene/acrylonitrile monomer mixture in the presence of a free radical catalyst (azobisisobutronitrile), as described in Union Carbide's Belgian Pat. No. 788,115. The poly (oxyalkylene) diol is made by first reacting propylene glycol with propylene oxide and then subsequently with ethylene oxide so that the chains terminate in ethylene oxide units.

The "MDI" was 4, 4' diphenylmethane diisocyanate.
The "BDO" was 1, 4-butanediol.

The wax was an ethylene-bis-stearamide, Advawax 280°F, sold by Cincinnati Milacron Chemical, Inc., Reading, Ohio, 45215.

The interesting point made by the above table is that while the −20°F stiffness value of 9855 psi is outstanding there is not an unacceptable loss in physical properties at the higher temperatures. For example, the 160°F stiffness value is 4839 psi.

What is claimed is:

1. An injection molding-grade thermoplastic polyurethane having good low temperature properties made by reacting the following:

| | |
|---|---|
| Grafted polyol, PBW | 100 |
| Aromatic Polyisocyanate, to FNCO of | 7 to 15 |
| $C_1$–$C_4$ alkane diol, PBW | 5 to 30 | wherein:
said grafted polyol is a 2000 to 5000 molecular weight copolymer of:
a. 70 to 90 weight percent of a 1000 to 4000 molecular weight poly (oxy $C_1$–$C_4$ alkene) diol, reacted by free radical polymerization with
b. 10 to 30 weight percent of a monomer mixture of 1 part by weight of a vinylaromatic and 0.1 to 9 parts of an olefinic $C_2$–$C_6$ nitrile.

2. The polyurethane of claim 1 wherein said grafted polyol and aromatic polyisocyanate are first reacted to form a prepolymer having a free NCO in the range of 8 to 12, followed by addition of said $C_2$–$C_6$ alkane diol.

3. The polyurethane of claim 2 wherein:
said grafted polyol is composed of a 2400 to 3200 molecular weight poly (oxypropylene-ethylene) diol and a 50/50 styrene/acrylonitrile monomer mixture reacted therewith by a free radical polymerization.
said aromatic polyisocyanate is MDI, and
said $C_2$–$C_6$ alkane diol is 1, 4 butanediol.

4. The polyurethane of claim 3 wherein the mixture is cast as a slab at a termperature above 210°F, cured for a few days and ground to size for injection molding.

5. An automobile exterior trim component made from the polyurethane of claim 1.

* * * * *